United States Patent
Lin et al.

(10) Patent No.: US 7,527,894 B2
(45) Date of Patent: May 5, 2009

(54) IDENTIFYING DEFECTIVE ELECTRODES IN LITHIUM-ION POLYMER BATTERIES

(75) Inventors: Thomas Lin, Rancho Palos Verdes, CA (US); Larisa Malinovskaya, Torrance, CA (US); Jun Chen, Redondo Beach, CA (US)

(73) Assignee: Caleb Technology Corporation, Torrance, CA (US)

( * ) Notice: Subject to any disclaimer, the term of this patent is extended or adjusted under 35 U.S.C. 154(b) by 260 days.

(21) Appl. No.: 11/533,274

(22) Filed: Sep. 19, 2006

(65) Prior Publication Data

US 2008/0066298 A1   Mar. 20, 2008

(51) Int. Cl.
*H01M 10/04* (2006.01)
(52) U.S. Cl. .................. 429/122; 429/90; 29/623.1
(58) Field of Classification Search .............. 429/90, 429/122; 29/623.1
See application file for complete search history.

(56) References Cited

U.S. PATENT DOCUMENTS

| | | | |
|---|---|---|---|
| 4,156,754 A | 5/1979 | Cobbs, Jr. et al. | |
| 4,716,088 A | 12/1987 | Reichman et al. | |
| 4,816,357 A | 3/1989 | Hope et al. | |
| 4,849,311 A | 7/1989 | Itoh et al. | |
| 5,248,573 A | 9/1993 | Arkens et al. | |
| 5,273,846 A | 12/1993 | Plichta et al. | |
| 5,362,582 A | 11/1994 | Chang et al. | |
| 5,387,482 A | 2/1995 | Anani | |
| 5,426,005 A | 6/1995 | Eschbach | |
| 5,449,576 A | 9/1995 | Anani | |
| 5,498,489 A | 3/1996 | Dasgupta et al. | |
| 5,498,493 A | 3/1996 | Dahn et al. | |
| 5,552,239 A | 9/1996 | Gozdz et al. | |
| 5,587,257 A | 12/1996 | Tibbetts et al. | |
| 5,612,153 A | 3/1997 | Moulton et al. | |
| 5,743,921 A | 4/1998 | Nazri et al. | |
| 5,759,715 A | 6/1998 | Barker et al. | |
| 5,772,703 A | 6/1998 | Guindy | |
| 5,998,065 A | 12/1999 | Tsutsumi et al. | |
| 6,001,509 A | 12/1999 | Kim et al. | |
| 6,268,087 B1 | 7/2001 | Kim et al. | |
| 6,344,293 B1 | 2/2002 | Geronov | |
| 6,372,387 B1 | 4/2002 | Kawakami et al. | |
| 6,395,043 B1 | 5/2002 | Shadle et al. | |
| 6,395,423 B1 | 5/2002 | Kawakami et al. | |
| 6,488,721 B1 | 12/2002 | Carlson | |
| 6,545,448 B1 * | 4/2003 | Stanley et al. | 320/132 |
| 6,586,135 B2 | 7/2003 | Gan et al. | |
| 6,605,385 B2 | 8/2003 | Gan et al. | |
| 6,653,020 B2 | 11/2003 | Amatucci et al. | |

(Continued)

FOREIGN PATENT DOCUMENTS

| | | |
|---|---|---|
| EP | 0762524 A1 | 3/1997 |
| EP | 0762524 B1 | 10/1999 |
| JP | 2000-030763 | 1/2000 |
| JP | 2002-352862 | 12/2002 |

OTHER PUBLICATIONS

Aurbach, D. et al. Design of Electrolyte Solutions for Li and Li-Ion Batteries: A Review. *Electrochimica Acta*, vol. 50, Issues 2-3, Nov. 30, 2004, pp. 247-254.

*Primary Examiner*—Mark Ruthkosky

(57) ABSTRACT

Methods and apparatus for identifying defective lithium-ion polymer battery electrodes are disclosed. The methods include assembling a stack of electrodes, monitoring voltage of the stack during the assembling, and identifying defective electrodes based on the voltage monitoring.

7 Claims, 4 Drawing Sheets

U.S. PATENT DOCUMENTS

| | | | |
|---|---|---|---|
| 6,755,873 B2 | 6/2004 | Mizutani et al. | |
| 6,776,807 B2 | 8/2004 | Shida et al. | |
| 6,805,720 B1 | 10/2004 | Yajima et al. | |
| 6,818,353 B2 | 11/2004 | Mori et al. | |
| 6,828,065 B2 | 12/2004 | Munshi | |
| 6,835,214 B2 | 12/2004 | Kitano et al. | |
| 6,881,233 B2 | 4/2005 | Cho et al. | |
| 6,881,514 B2 | 4/2005 | Ahn et al. | |
| 6,884,547 B2 | 4/2005 | Mori et al. | |
| 6,893,756 B2 * | 5/2005 | Clingerman et al. | 429/22 |
| 6,908,704 B2 | 6/2005 | Lee | |
| 7,022,290 B2 | 4/2006 | Gural et al. | |
| 7,132,833 B2 * | 11/2006 | Layden et al. | 324/429 |
| 2002/0007552 A1 | 1/2002 | Singleton et al. | |
| 2002/0136946 A1 | 9/2002 | Amatucci et al. | |
| 2002/0142217 A1 | 10/2002 | Amatucci et al. | |
| 2003/0008213 A1 | 1/2003 | Cho | |
| 2003/0157411 A1 | 8/2003 | Jung et al. | |
| 2003/0211397 A1 | 11/2003 | La Ferla et al. | |
| 2004/0002005 A1 | 1/2004 | Gao et al. | |
| 2004/0172808 A1 | 9/2004 | Fraser et al. | |
| 2004/0175621 A1 | 9/2004 | Iriyama et al. | |
| 2004/0191617 A1 | 9/2004 | Visco et al. | |
| 2005/0019656 A1 | 1/2005 | Yoon et al. | |
| 2005/0100790 A1 | 5/2005 | Ota et al. | |
| 2005/0158624 A1 | 7/2005 | Park et al. | |
| 2006/0051671 A1 | 3/2006 | Thackeray et al. | |
| 2006/0051673 A1 | 3/2006 | Johnson et al. | |
| 2006/0078790 A1 | 4/2006 | Nimon et al. | |
| 2006/0085972 A1 | 4/2006 | Sudano et al. | |
| 2006/0115717 A1 | 6/2006 | Schubert et al. | |

* cited by examiner

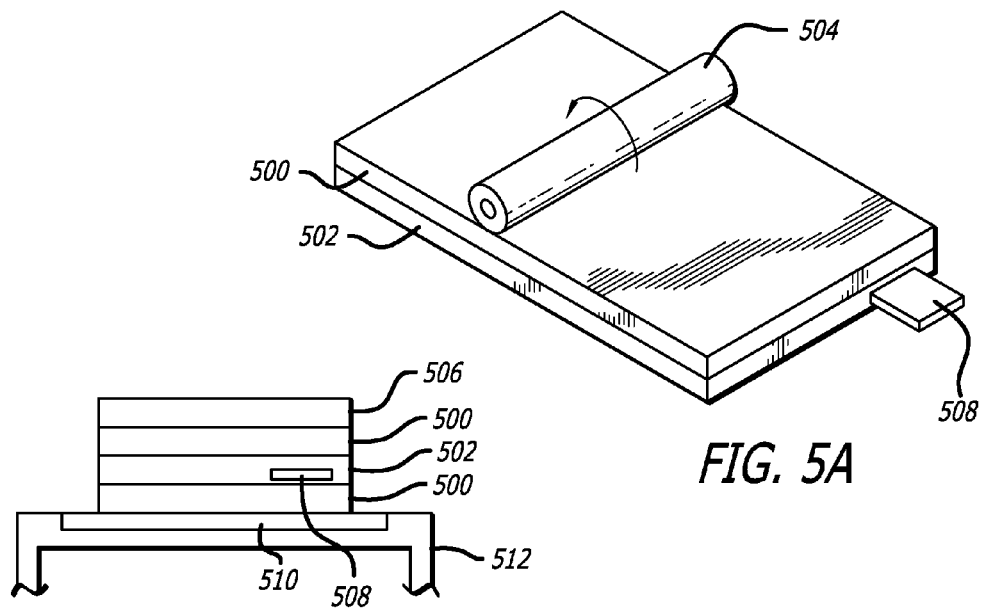
FIG. 5A
FIG. 5B
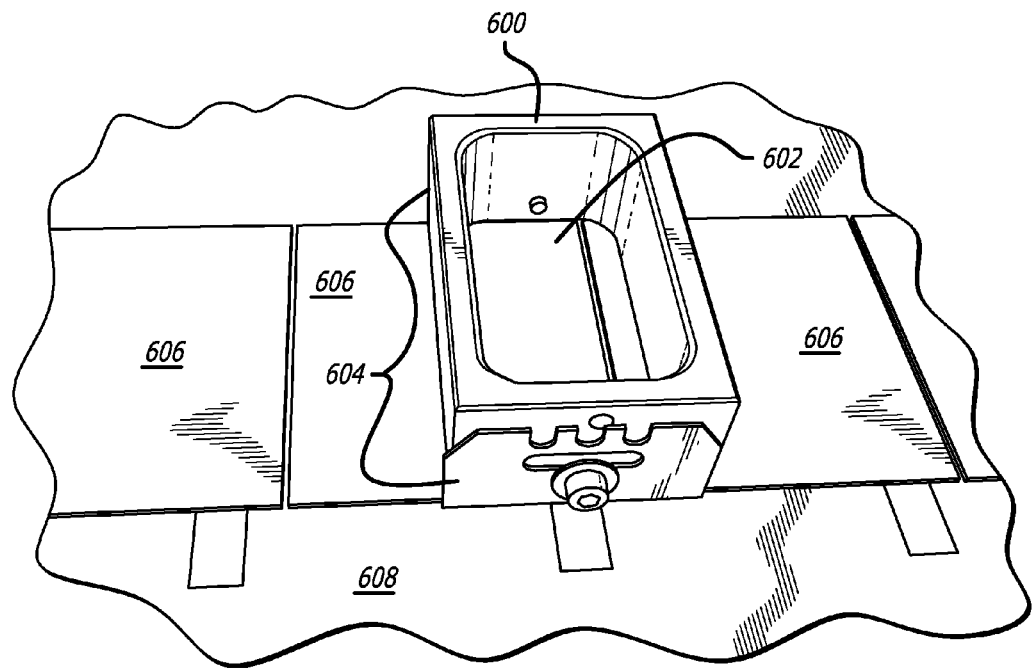
FIG. 6

IDENTIFYING DEFECTIVE ELECTRODES IN LITHIUM-ION POLYMER BATTERIES

BACKGROUND

1. Field

The present disclosure relates generally to batteries, and more particularly, to lithium-ion polymer batteries.

2. Background

In an age when mobility is essential, large and heavy batteries are no longer acceptable. Technology has responded with the emergence and development of a new type of battery. Lithium-ion polymer batteries employ a relatively new technology to offer higher energy density, greater safety and lower weight than traditional lithium-ion rechargeable batteries.

Traditional lithium-ion batteries use a lithium salt electrolyte held in an organic solvent. The solvent is flammable, hazardous, difficult to handle, and must be encased in durable enclosures that increase battery weight. Lithium-ion polymer batteries, on the other hand, hold the lithium salt electrolyte in a dry solid polymer composite. This electrolyte resembles a plastic-like film that does not conduct electricity but allows the exchange of ions (electrically charged atoms or groups of atoms) between the battery's electrodes. One electrode is called the "cathode." The cathode produces ions when negative polarity, applied to drive the battery, causes an electrochemical reaction and reduction of the cathode material. The other electrode is called the "anode." The anode produces electrons through oxidation, which occurs when the anode material reacts with the electrons that were released from the cathode. The electrons pass from cathode to anode through the solid polymer composite. Unlike solvent-based electrolytes, the solid polymer composite used in lithium-ion polymer batteries is light, non-flammable and capable of being sealed in thin, flexible packaging instead of the traditional heavy casings. Therefore, lithium-ion polymer batteries can offer higher energy density, lower weight, and specialty shaping to enable slim geometry and fit virtually any application.

Unfortunately, lithium-ion polymer battery technology still has many hurdles to overcome before it can be effectively utilized on a large scale. These batteries are expensive to manufacture, and impractical to produce in commercially viable quantities, for a number of reasons that are unique to this new technology. Even those batteries able to be produced in small quantities do not achieve their full potential because limitations in current manufacturing techniques contribute to deterioration of battery performance and cycle life characteristics.

For example, battery quality may be compromised in the event a defective electrode is used in the battery cell stack. When electrodes coated with polymer electrolyte film are manufactured in large batches, some percentage of the electrodes produced may be defective for one or more reasons. For example, an imperfection in the polymer electrolyte film may leave the electrode insufficiently insulated so that it might cause an electrical short. However, there not currently and effective and efficient method for testing the viability of individual electrodes prior to their incorporation in a battery cell stack. These defective electrodes may therefore be unknowingly used when assembling battery stacks. Unfortunately, if battery quality is insufficient due to one electrode, or even a small number of electrodes, the entire battery must be discarded. This means that even good electrodes are discarded. Good electrodes cannot be easily separated from the faulty ones once the battery has been assembled. Therefore, discarding batteries that have electrical shorts due to faulty electrodes results in the waste of good electrodes and the reduction of manufacturing throughput.

SUMMARY

In one aspect of the present invention, a method of identifying defective electrodes during battery assembly includes assembling a stack of electrodes, monitoring voltage of the stack during the assembling, detecting a voltage drop during the monitoring, identifying one of the electrodes as being associated with the detected voltage drop, removing the identified electrode from the stack, and continuing the assembling.

In another aspect of the present invention, an apparatus for identifying defective electrodes during battery assembly includes means for assembling a stack of electrodes, means for monitoring voltage of the stack during the assembling, means for detecting a voltage drop during the monitoring, means for identifying one of the electrodes as being associated with the detected voltage drop, means for removing the identified electrode from the stack, and means for continuing the assembling.

It is understood that other embodiments of the present invention will become readily apparent to those skilled in the art from the following detailed description, wherein it is shown and described only various embodiments of the invention by way of illustration. As will be realized, the invention is capable of other and different embodiments and its several details are capable of modification in various other respects, all without departing from the spirit and scope of the present invention. Accordingly, the drawings and detailed description are to be regarded as illustrative in nature and not as restrictive.

BRIEF DESCRIPTION OF THE DRAWINGS

Various aspects of a communications system are illustrated by way of example, and not by way of limitation, in the accompanying drawing, wherein:

FIG. 5 illustrates a method of forming a solid electrolyte interface film on an anode surface;

FIG. 6 illustrates a coating apparatus that may be used for certain aspects of manufacturing a lithium-ion polymer battery.

DETAILED DESCRIPTION

The detailed description set forth below in connection with the appended drawings is intended as a description of various embodiments of the invention and is not intended to represent the only embodiments in which the invention may be practiced. The detailed description includes specific details for the purpose of providing a thorough understanding of the invention. However, it will be apparent to those skilled in the art that the invention may be practiced without these specific details. In some instances, well known structures and components are shown in block diagram form in order to avoid obscuring the concepts of the invention.

Figure 1:
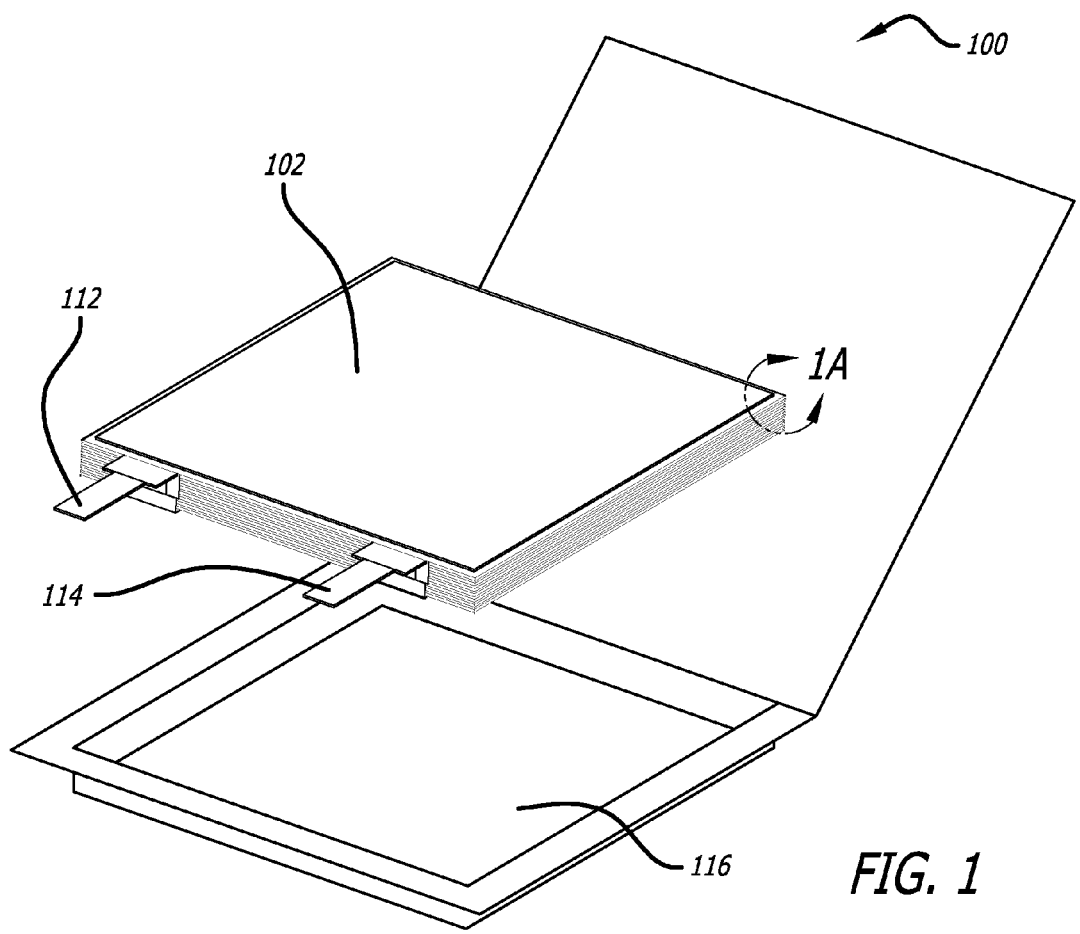
FIG. 1 illustrates a lithium-ion polymer battery.
Figure 1A:
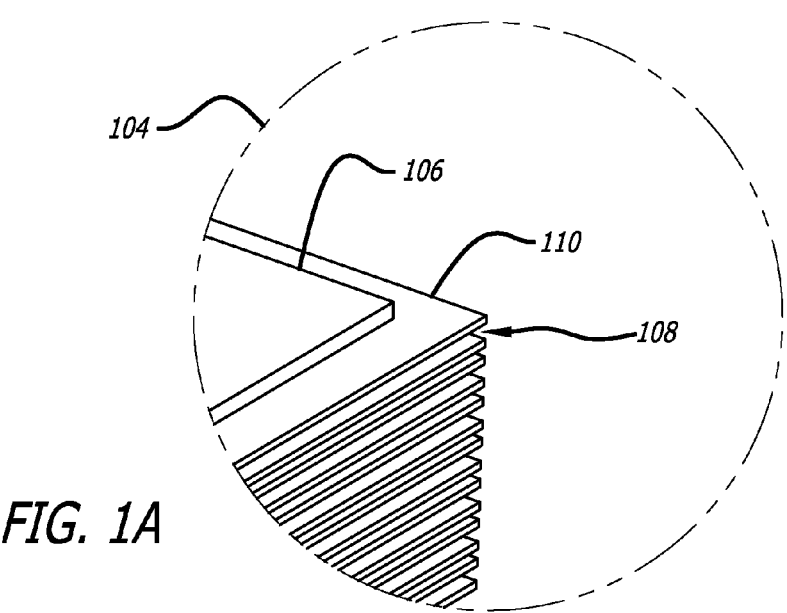

FIG. 1 illustrates typical components of a lithium-ion polymer battery 100. The battery 100 comprises a plurality of stacked cells 102. As shown in magnified view 104 of FIG. 1A, each cell comprises an anode 106, a cathode (not explicitly shown, but whose location is shown generally at 108) and a polymer electrolyte layer 110 separating the anode 106 and cathode 108. The anodes in the cell stack 102 may lead to a single negative battery output 112. The negative output may comprise a tab formed of metal such as Ni, Cu, or SS, for example. The cathodes in the cell stack 102 may lead to a single positive battery output 114. The positive output may comprise a tab formed of metal such as Al, Ni, or SS, for example. The cell stack 102 may be contained within a flexible pouch package 116 that allows the protrusion of battery outputs 112 and 114 thereby forming a self-contained lithium-ion polymer battery 100.

Figure 2:
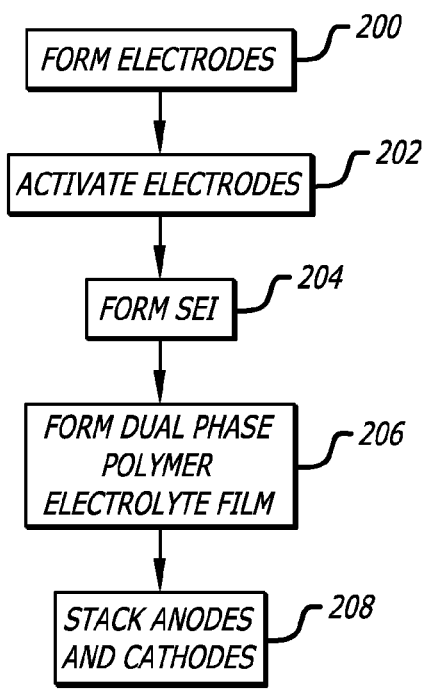
FIG. 2 is a flow chart illustrating a method of manufacturing a lithium-ion polymer battery.

FIG. 2 is a flow chart illustrating a method of manufacturing a lithium-ion polymer battery. At block 200, electrodes may be formed with materials selected for particular use in anodes and cathodes. At block 202, the formed electrodes may be activated with non-aqueous electrolytic solutions containing lithium salt and additives dissolved in organic solvents. The solutions may be specifically formulated and selected for electrochemical stability enhancement of anode and cathode structures, based in part upon the materials that were selected at block 200. Next, at block 204, a solid electrolyte interface ("SEI") film may be formed in situ on the activated anode. Then, at block 206, a dual phase polymer electrolyte film may be formed and coated directly on the activated cathodes and anodes. At block 208, the anodes (activated and coated with SEI and polymer electrolyte film) and the cathodes (activated and coated with polymer electrolyte film) may be stacked together in an alternating fashion to form a lithium-ion polymer battery. Each of these steps are described below in further detail.

First, electrodes may be formed with materials selected for particular use in anodes and cathodes. Each anode and cathode may have a composite structure comprising a mixture of active material, conductive additive and binder. For anodes, the ratio of these components may be, but is not limited to, approximately 90 to 98% active material by weight, 2 to 10% conductive additive by weight and 2 to 20% binder by weight. For cathodes, the ratio of these components may be, but is not limited to, approximately 80 to 96% active material by weight, 2 to 20% conductive additive by weight and 2 to 8% binder by weight. Those skilled in the art will recognize that a wide range of different ratios is possible when forming the electrodes. For both anodes and cathodes, the active material may be mixed with the conductive additive and kneaded together with the binder to prepare a paste. This paste may be coated on a plate, such as a metallic current collector. Alternatively, it may be pressed into a net-like metal current collector. The current collector may be Al or Cu coated mesh, for example. The mixing and kneading may be performed, for example, by a mechanical mixer having appropriate amounts of the component materials added by hand or by automatic measuring means, for example. Automatic measuring means may include devices such as scales or containers for measuring weight or volume, for example. The forming of electrodes, by coating or pressing the paste mixture of electrode materials into an electrode form, may be performed by hand or mechanical means, for example.

Because the electrodes are to be activated with electrolytic solution, they may be formed of porous materials having a structure that includes spaces to retain the solution, such as capillary spaces, for example. Active material for anodes, such as graphite and other carbon materials discussed in more detail below, may naturally possess this type of porous structure. Active material for cathodes, on the other hand, such as transition metal oxide particles discussed in more detail below, may be non-porous by nature. Therefore, to prepare cathodes, carbon black may be added to the active material. Not only may carbon black enhance electrolyte retention in the cathodes, but it may also compensate for the relatively low electric conductivity that cathode active materials often have. Those skilled in the art will recognize that carbon black may be used as an additive to enhance electrolyte retention in anode materials also. Thus, carbon black may serve as a conductive additive for both types of electrodes. Other conductive additives that may be used include, but are not limited to, acetylene black, graphite, or micro or nano size particles of metals such as Ni, Al, SS, or Cu. Finally, the binder may comprise a polymer that is chemically and electrochemically stable and compatible with the other elements chosen for the anode or cathode and the electrolytes that will be used to activate them.

Active material for anodes may include, for example, graphite materials such as amorphous carbon materials, artificial graphite fired at high temperature such as approximately 2000° or more, or natural graphite. Other examples may include, but are not limited to, alkali metals or alloys of alkali metals including Al, lead (Pb), tin (Sn), silicon (Si), and the like; cubic system intermetalic compounds that can intercalate alkali metal between their crystal lattices (e.g. AlSb, Mg2Si, NiSi2); Lithium nitrogen compounds (Li(3-x)M×N (M=transition metal), and the like. Active material for cathodes may include, for example, lithiated transition metal oxides such as Lithium cobaltate ($LiCoO_2$), lithium nickelate ($LiNiO_2$), lithium manganate ($LiMn_2O_4$, $LiMnO_2$) or lithium ferrate ($LiFeO_2$). Mixtures of the above materials may be used as well, for anode material and for cathode material. In addition, cathode material may be combined with dopants. However, these are just a few examples. Those skilled in the art will recognize that many other materials are also suitable for use as the active material component in anodes and cathodes. Binder materials may include, but are not limited to, polyvinylidene fluoride (PVdF), polytetrafluoroethylene (PTFE), ethylene-propylene diene (EPDM), styrene-butadiene rubber (SBR), polyvinyl chloride (PVC), or carboxymethyl cellulose (CMC).

After the electrodes are formed, they may be activated with non-aqueous electrolytic solutions containing lithium salt and additives dissolved in organic solvents. By activating the electrodes prior to battery assembly, optimum solution formulas can be selected for each of the anode and cathode electrodes. Specifically, the solutions may be formulated and selected for electrochemical stability enhancement of anode and cathode structures. In other words, an electrolytic solution for activating anodes may be selected to have minimal reduction when combined with anode material, and an electrolytic solution for activating cathodes may be selected to cause minimal oxidation of cathode material. In this way, side reactions on each electrode can be controlled independently, so that battery performance and cycle life characteristics are enhanced and preserved. Another advantage to activating the electrodes early in the manufacturing process, such as before the formation of the SEI layer on the anode surface, is that activation has the effect of removing gas from the porous electrode structure, thereby preventing the formation of bubbles in the electrolyte layer and forming a uniform SEI layer on the anode. Gas is removed from the electrode structure when it is displaced by electrolytic solution during activation.

"Wettability" refers to the ability of electrode material to absorb activating solution. Carbon blacks and other graphite materials used in the formation of electrodes may be porous but also may have very low wettability. This is because graphite materials have low surface free energy, while the surface tension of electrolytes is high. When the wettability of electrode materials is low, activation may take a long time and may also be incomplete. For example, an electrode may have to be submerged in electrolytic solution for several hours before the capillary phenomenon of the porous electrode structure, which may initially be filled with gas, is able to draw enough of the solution into the electrode. Even then, diffusion of the electrolytic solution through the capillary network may be incomplete, resulting in localized electrode areas having an over-charge or over-discharge state. This slows the manufacturing process and results in poor electrode performance and reduced battery storage capacity.

Figure 3:
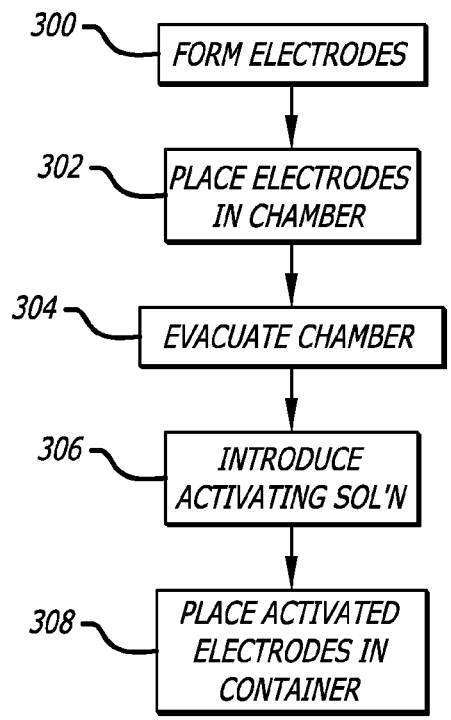
FIG. 3 is a flow chart illustrating additional aspects of a method of manufacturing a lithium-ion polymer battery.

For these reasons, merely immersing the electrodes in electrolytic solution may not be sufficient to fully or efficiently activate the electrodes. In order to realize a uniform and rapid electrode reaction with the activating electrolytic solution, the solution should rapidly penetrate into the spaces of the porous electrodes. Thus, an alternative method for electrode activation is described in reference to FIG. 3, which is a flow chart illustrating additional aspects of a method of manufacturing a lithium-ion polymer battery. At block 300, the electrodes may be formed as described above. At block 302 the electrodes may be placed in a chamber that can be sealed and have a vacuum formed therein. At block 304 a pump connected to the chamber may be activated to remove air from the chamber, reducing the pressure inside the chamber. The removal of air from the chamber includes removal of gas from within the porous electrode structures. When the gas from within the electrodes is sufficiently evacuated, which may occur for example at a reduced chamber pressure of approximately −30 psi or below, activating electrolytic solution may be introduced into the chamber, at block 306. In a very short amount of time, for example, on the order of seconds, the electrolytic solution may be diffused throughout the porous electrodes. Anode and cathode electrodes may be placed in the chamber and activated at the same time, with different electrolyte solutions. A metered amount of solution selected for each electrode type, as explained below, may be introduced into the chamber and directed to the appropriate electrode. Because of the reduced atmosphere within the chamber, the solution may penetrate the electrode pores almost immediately upon contact with the electrode. If the amount of solution is carefully metered according to the electrode size and estimated or measured space available within the porous electrode structure, the activated electrode may remain relatively dry on its surface, having the solution drawn completely within its porous structure. Now activated, at block 308 the electrodes may be placed in containers until they are ready for further manufacturing and assembly processes.

Figure 4:
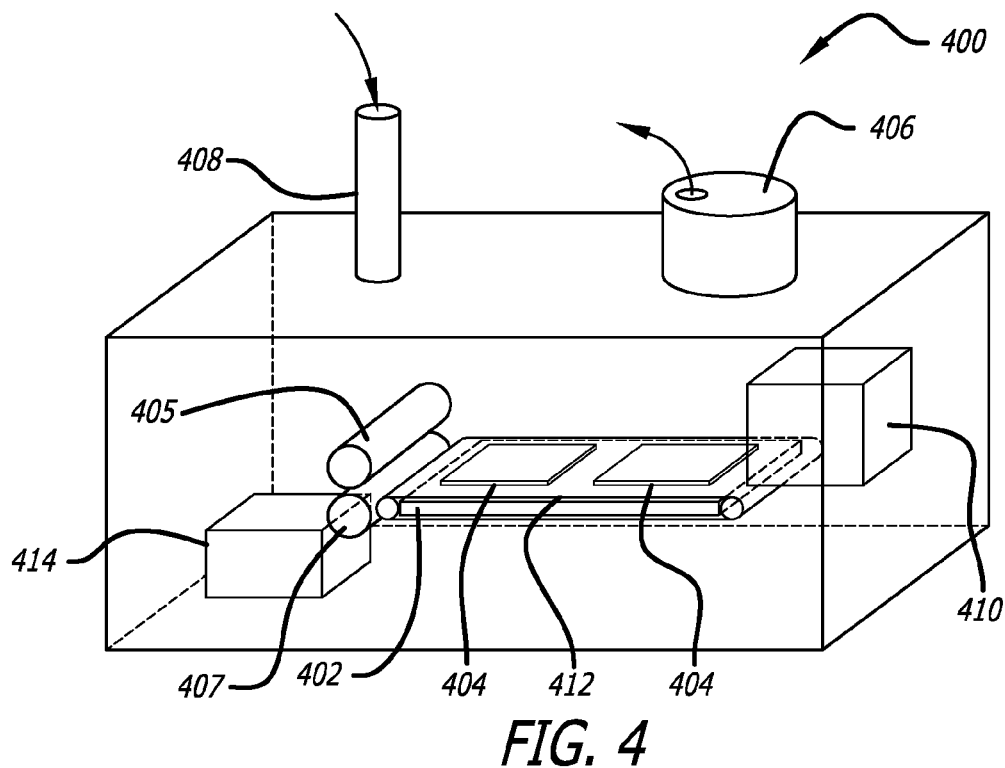
FIG. 4 illustrates a chamber that may be used for certain aspects of manufacturing a lithium-ion polymer battery.

FIG. 4 illustrates a chamber 400 that may be used for the electrode activation process described above. A tray or table 402 within the chamber 400 may be used to hold electrodes 404. A vacuum 406 may be attached to the chamber 400 for evacuation of air from within the chamber. The evacuation of air caused by the vacuum 406 may include the removal of gas from within the porous structure of electrodes 404, causing the electrodes 404 to become highly wettable. One or more openings such as inlet 408 may be accessible from the outside for introducing substances into the evacuated chamber. The inlet 408 may be used, for example, to introduce the activating electrolytic solution into the chamber containing the now-wettable electrodes 404. More than one inlet 408 may be used, for example to activate multiple electrodes with multiple electrolyte solutions. As described above, the reduced pressure atmosphere may cause the solution to be drawn into the electrode structure immediately upon contact, so that multiple solutions can be introduced into the chamber for the purpose of activating multiple electrodes, even of different types, at the same time.

The electrolytic solutions used for electrode activation may be prepared by dissolving solutes in non-aqueous solvents. The solution for each of the cathode and anode electrodes may be chosen to meet certain criteria. For example, the solution may be able to dissolve salts to a sufficient concentration. The solution may have low enough viscosity to support facile ion transport. The solution may remain inert to other battery components. The solution may be capable of forming a SEI on the anode surface, such that the SEI remains stable at high temperatures without effecting battery performance. The solution may minimize oxidation of the highly oxidative cathode surface at high cell potential. The solution may also have properties such that it experiences minimal reduction when combined with the anode material. Further, the solution may remain liquid in a wide temperature range, by having a low melting point and a high boiling point. The solution may also have a high flash point and low toxicity so that it is safe, and it may also be economical.

Those skilled in the art will recognize many different electrolytic solutions that meet some or all of the above criteria for each of the cathode and anode electrodes. Some examples of electrolytic solutions compatible with $C/LiCoO_2$ electrode active materials include: 1 mol of $LiPF_6$ dissolved in PC/DEC solvents combination; 1 mol of $LiBF_4$ salt dissolved in PC/EC/γ-BL solvent combination; $LiPF_6$ salt dissolved in EC/DEC/co-solvent (EMC, DMC) combination; $LiPF_6$ salt dissolved in EC/DMC solvent combination; and $LiPF_6$/LiN$(CF_3SO_2)_2$ dissolved in EC/co-solvent combination. Of course, those skilled in the art will recognize that this list is not exclusive and that many other examples are possible.

Carbonates and esters, such as EC, PC, DMC, DEC, EMC, ethyl methyl sulfone, MA (methyl acetate), EA (ethyl acetate) and the like, may be more anodically stable and therefore well-suited for cathode electrolyte formulations. On the other hand, anode film forming additives may cause a reversing effect in these cathode electrolytes, due to the continuous oxidation. As a result, cathode performance may deteriorate somewhat. These solvents may be used each alone or in combination of two or more. Of course, those skilled in the art will recognize that this list is not exclusive and that many other examples are possible.

Some examples of electrolytic solutions compatible with anode active materials include SEI layer forming additives and ether solvents. The ether solvents may comprise THF (tetrahydrofuran), DME (1,2-dimethoxymethane) and carboxylic acid esters such as γ-BL, γ-valerolactone. The SEI layer forming additives may comprise VC-vinylene carbonate, ES-ethylene sulfite, and the like. These solvents may be used in combination with ester solvents too. Again, those skilled in the art will recognize that this list is not exclusive and that many other solutions may have good resistance to reduction and therefore be suitable anode electrolyte formulations.

After the anodes are activated, they may have an SEI film formed on their surface. As illustrated in FIG. 5A, the in situ chemical formation of the anode SEI layer may be accomplished by placing a thin layer of lithium metal 500 on the anode 502. The lithium metal may comprise a foil formed by sputtering lithium metal onto a copper foil, for example. A thin piece of lithium metal or a metalized polymer film with lithium metal sputtered on it can also be used. Those skilled in the art will recognize other suitable options as well. The thickness of the anode and the lithium metal layer may be approximately the same. The thickness of lithium metal may be approximately 2 to 30 μm, for example. However, other thicknesses are possible. The anode and the lithium metal layer may be aligned placed together by hand, a robotic arm or other mechanical means. Pressure may be applied, for example with a roller 504, to place the lithium metal layer in more thorough and direct contact with the entire surface area of the anode.

As illustrated in FIG. 5B, the two layers may then be covered with another layer of material 506, such as Mylar for example. Then, a vacuum source 510 incorporated within the supportive table 512 may be activated to ensure good interfacial contact between the anode and the lithium foil. The lithium metal layer 500 may then be shorted to the current collector 508 for a brief time, such as approximately fifteen minutes or some other amount of time less than thirty minutes, for example. The short may be achieved with a simple circuit switch, for example. During this time, the lithium metal may react with the electrolyte reduction products on the anode surface. Specifically, an electrochemical reaction may occur, during which the lithium is oxidized so that lithium ions having a positive charge are produced and electrons are released. The released electrons may react with the electrolyte solvents within the wetted anode, which may be reduced and then react with the lithium ions. Accordingly, the electrolytic solution used for anode activation as described above may contain special solvents and additives to promote the formation of the thin ionically conductive SEI layer on the graphite anode surface. The SEI layer formation process may be completed when the voltage of the coupled lithium metal 500 and anode 502 drops from an initial value of approximately 3V to approximately 150 mV, for example. The voltage may be monitored continuously and digital or software logic may be employed to automatically open the circuit switch or otherwise disconnect the short when the voltage drop is detected.

Dynamics of the SEI layer formation may depend upon the formulation of the activating electrolytic solution, the type of graphite used for the anode, the conditions of graphite-lithium metal contact and the balance between the masses of graphite and lithium. Specifically, the amount of lithium necessary for sufficient SEI layer formation may be proportional to the graphite surface area and the amount of graphite in the anode. The proportional relationship may be expressed as $m_{Li}=k_s m_{Gr}$, wherein $m_{Li}$ is the mass of lithium required for a sufficient SEI layer, $m_{Gr}$ is the mass of graphite in the anode and $K_s$ is a coefficient, which is proportional to the graphite surface area. The amounts need not be exact, however, for an adequate SEI layer to be formed on the wetted anode surface.

After the in situ SEI film formation, a dual phase polymer electrolyte film may be formed and coated directly on the cathodes and the anodes. A solid polymer electrolyte film may comprise a polymer network capable of dissolving inorganic salts and accepting polymer plasticizers and modifiers. It also may exhibit sufficient conduction for cell operation at room temperature. However, those skilled in the art will recognize that better conduction may be achieved at elevated temperature, because motion within in these polymer ion conductors is closely associated with local structural relaxations related to the glass transition temperature of the polymer. Nevertheless, if the electrodes are not activated prior to the polymer electrolyte coating, poor interfacial contact between the solid polymer electrolyte film and the electrode materials may result. In turn, ion transport may be difficult to achieve even at elevated temperatures.

By activating the electrodes prior to coating the polymer electrolyte film thereon, ion transport inefficiencies due to the poor interfacial contact between the solid polymer electrolyte film and the electrode materials may be significantly reduced. The combination of liquid electrolytes, which may be loaded in the porous spaces of the electrodes during activation, and the gel-polymer electrolyte film, which may be interposed between the electrodes and block communication between two different electrolytes used to separately activate anodes and cathodes, may help improve ion transport through the interfacial contact. Because the electrodes may be well wetted and soaked from the preliminary activation, the electrode/electrolyte interface may be well extended into the porous electrode structure, thereby forming a continuous network between the gel electrolyte and the electrodes. Thus, interfacial impedance may be significantly reduced, giving the resultant battery improved cyclability, ability to accept high current rates and improved safety. The polymer electrolyte film may have a microporous structure, having no voids through which electrical contact between electrodes could be established. The microporous film thereby serves as a good insulator between anodes and cathodes.

To form the polymer electrolyte film, activated anodes and cathodes may be laid down side by side in an alternating pattern on a supporting web. A polymer electrolyte solution may then be directly coated on the electrode surfaces. The electrolyte composition may contain a base polymer and copolymers that contribute to bonding between battery electrodes when they are eventually stacked. The base polymer may be formulated so that intimate molecular contact can be achieved at the interface between the contacting electrolyte layers coated on each anode and cathode, and also at the interface between the electrode and electrolyte layer. This may improve bonding strength and ionic conductivity through the polymer interface. When the carrier solvent in the electrolyte composition evaporates, a uniform, dual face polymer electrolyte film may result and may include margins that extend beyond the electrode edges by an amount not in excess of 1.00±0.10 mm, for example.

FIG. 6 illustrates one example of a coating apparatus that may be used to coat the electrolyte film directly on an electrode surface. A coating head 600 may include a reservoir 602 for containing polymer electrolyte solution, and sharp blades 604 around all its lower edges. The sharp blades 604 may surround each electrode 606 that lies on a coating surface 608 during formation of the electrolyte film. The blades may form a removable retention boundary for retaining polymer electrolyte solution when it is deposited from the reservoir 602 onto the electrode 606. The retention boundary may include space between the edges of the electrode 606 and the blades 604, so that when the polymer electrolyte solution is applied to the electrode 606 it is also applied to exposed portions of the coating surface 608 that are between the electrode edges and the sharp blades 604. The blades may be sufficiently sharp, for example, to closely engage and achieve close contact with the coating surface. The close contact may ensure that any irregularities in the coating surface will not produce any significant holes, spaces or gaps between the coating surface and the sharp blades. Thus, the viscous electrolytic solution that is applied to the exposed portions of the coating surface 608 may not be able to seep through during the coating process. In other words, the sharp blades 604, when brought in contact with the coating surface, may effectively retain the electrolytic solution within the confines of the coating head as it is applied to the electrode surface.

The coating head 600 may move across the coating surface as it coats the electrodes 606. The rate of speed may depend on the rate of electrolyte layer formation. Approximately 1 to 10 milliseconds after applying an electrolyte coating, a surface film may form thereon. This surface film may prevent the electrolytic coating solution from spreading beyond the established boundaries of the coating blades after the coating head moves away and toward the next electrode. When the blades of the removable boundary are removed after the electrolytic solution has partially dried, the resultant film may have substantially even edges that are free from holes, tears or significant undulations. After complete evaporation, when the electrolytic solution has dried and become a solid polymer composite, the solid polymer composite film may also have substantially even edges that are free from holes, tears or significant undulations. Approximately three minutes after the application, the solvent may be completely evaporated at room temperature. Of course, those skilled in the art will recognize that these times are approximate and may depend on a number of factors including, for example, thickness and formulation of the coating. The speed of the coating head movement may be limited so that it does not exceed the rate of the polymer electrolyte surface formation. In other words, the coating head may remain over an electrode with its sharp blades in intimate contact with the coating surface for at least the amount of time required for a surface film to form on the electrolyte coating. However, the speed of coating head movement may be made to be as fast as possible without exceeding this lower tolerance, so that manufacturing speed is not unduly impacted. The rate of solvent evaporation may be governed by the energy available to the solvent, the volatility of the solvent species, and the vapor concentration of the local atmosphere. Saturation concentration may depend upon the gases in the atmosphere, the solvent species, and temperature. Since evaporation requires an input of energy, raising the temperature of the solvent will speed the surface evaporation process by providing additional energy.

After activation, SEI film formation on the anodes, and polymer electrolyte film formation on the anodes and cathodes, the coated electrodes may be stacked together to form a lithium-ion polymer battery. As the activated and coated electrodes are stacked, the voltage of the growing stack may be constantly monitored. Because the voltage may be predicted to be a known amount, and may be expected to remain at a constant level with the addition of each newly stacked electrode, in the event a voltage drop is detected following the addition of a new electrode to the stack, that new electrode may be identified as deficient. The deficient electrode may then be discarded.

Figure 7:
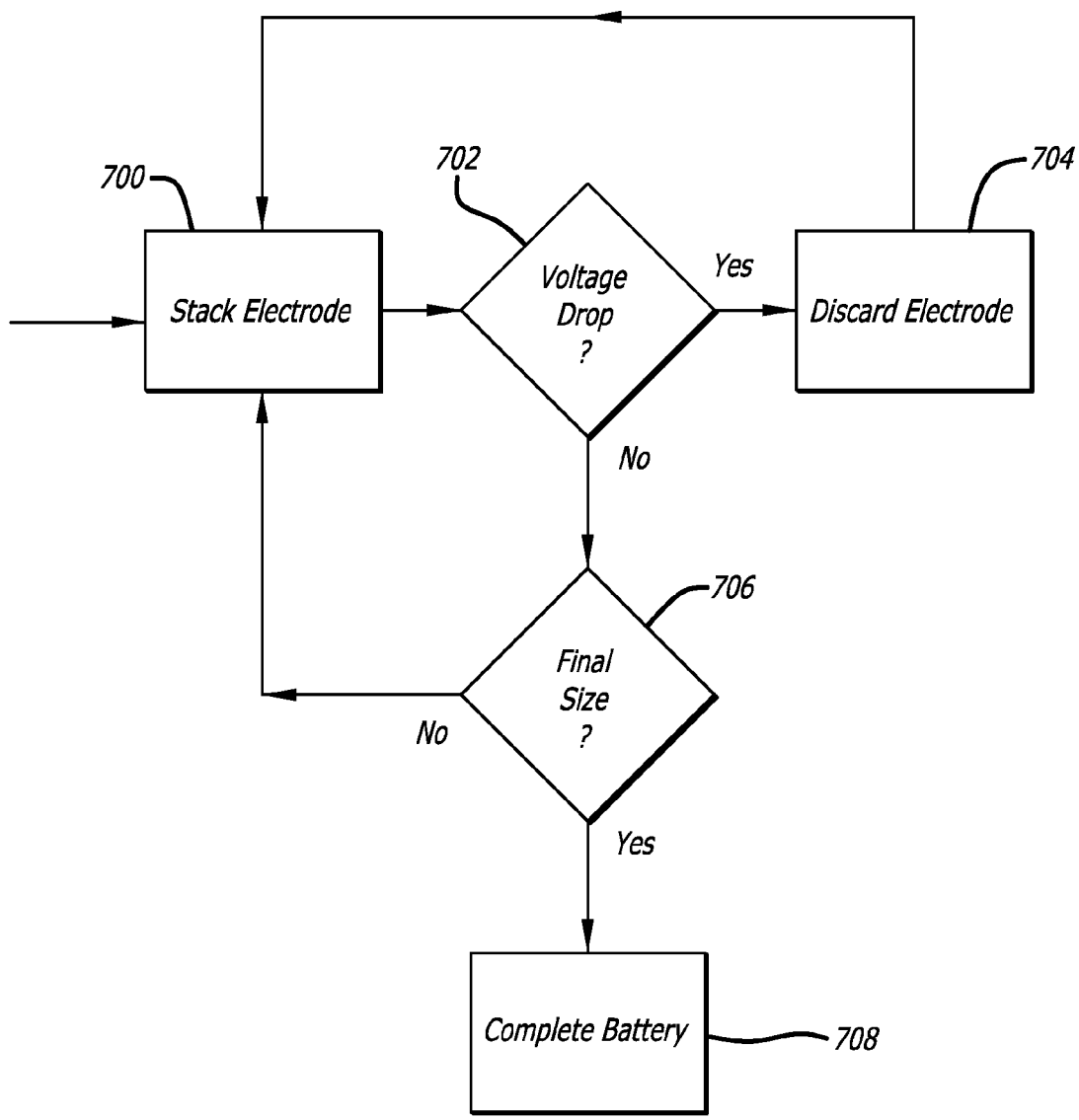
FIG. 7 is a flow chart illustrating further aspects of a method of manufacturing a lithium-ion polymer battery.

FIG. 7 is a flow chart illustrating a stacking procedure for assembling a lithium-ion polymer battery. At block 700, a cell stack may be formed by incrementally stacking one new electrode at a time. The stack may comprise a repeating and alternating pattern of anodes and cathodes. The electrodes may be individually added to the stack by hand, robotic arm, or other mechanical means, for example. The voltage of this cell stack may be constantly monitored to test for unexpected voltage drops with the addition of each electrode. The voltage may be monitored with a voltmeter, for example, having leads operatively connected to each end of the cell stack as it is being assembled. Based on the voltage monitoring, electrodes may be tested at decision block 702. In the event an electrode causes an unexpected voltage drop in the cell stack, it may be identified as a defective electrode and discarded at block 704. The defective electrode may be removed from the cell stack by hand, by robotic arm, or by other mechanical means, for example. It may then be subjected to further testing and may also then be discarded. Although batteries can be manufactured to have a wide range of possible voltages, an unexpected voltage drop during assembly of the stack may comprise a drop of more than approximately 70%, for example. If the voltage stays constant at the expected amount, however, the electrode may be classified as acceptable. The identification of a defective electrode may be performed by an automated process, such as digital or software logic operatively interfaced with the voltage monitor, for example. It could also include human intervention when a voltage drop is detected. Moreover, identification of a defective electrode may involve additional testing to verify that the detected voltage drop was the result of the identified electrode.

At decision block 706 the cell stack size may be compared to the desired battery size. If more electrodes are required to complete the battery, the stacking may continue at block 700. When the cell stack eventually reaches the desired size, a battery may be completed at block 708. Completing manufacture of the battery may include, for example, providing a single negative lead connected to the anodes and a single positive lead connected to the cathodes, ensuring the extending margin of the electrolyte polymer effectively insulates the electrode edges, and sealing the stack within flexible packaging.

The previous description is provided to enable any person skilled in the art to practice the various embodiments described herein. Various modifications to these embodiments will be readily apparent to those skilled in the art, and the generic principles defined herein may be applied to other embodiments. Thus, the claims are not intended to be limited to the embodiments shown herein, but is to be accorded the full scope consistent with the language claims, wherein reference to an element in the singular is not intended to mean "one and only one" unless specifically so stated, but rather "one or more." All structural and functional equivalents to the elements of the various embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of identifying defective electrodes during battery assembly, comprising:
   assembling a stack of electrodes;
   monitoring voltage of the stack during the assembling;
   detecting a voltage drop during the monitoring;
   identifying one of the electrodes as being associated with the detected voltage drop;
   removing the identified electrode from the stack; and
   continuing the assembling.

2. The method of claim 1 wherein the assembling comprises adding electrodes to the stack, one at a time.

3. The method of claim 2 wherein the adding of electrodes to the stack, one at a time, comprises adding anodes and cathodes to the stack in an alternating pattern.

4. The method of claim 2 wherein the monitoring comprises measuring voltage of the stack after each addition of an electrode.

5. The method of claim 1 wherein the identification of an electrode as being associated with the detected voltage drop comprises identifying which electrode caused the voltage drop.

6. The method of claim 1 wherein the voltage drop comprises a decrease of more than about 70%.

7. The method of claim 1 further comprising discarding the removed electrode.

* * * * *